(12) United States Patent  (10) Patent No.: US 8,929,029 B2
Min et al.                  (45) Date of Patent: Jan. 6, 2015

(54) HIGH DATA RATE WRITER DESIGN

(71) Applicant: Headway Technologies, Inc., Milpitas, CA (US)

(72) Inventors: Tai Min, San Jose, CA (US); Suping Song, Fremont, CA (US); Yuhui Tang, Milpitas, CA (US); Lijie Guan, Cupertino, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 13/863,495

(22) Filed: Apr. 16, 2013

(65) Prior Publication Data

US 2014/0307348 A1    Oct. 16, 2014

(51) Int. Cl.
    *G11B 5/147*        (2006.01)
(52) U.S. Cl.
    USPC .................................................. 360/125.11
(58) Field of Classification Search
    USPC .................................................. 360/125.11
    See application file for complete search history.

(56) References Cited

U.S. PATENT DOCUMENTS

| | | | |
|---|---|---|---|
| 7,212,379 B2 * | 5/2007 | Hsu et al. | 360/125.16 |
| 7,430,095 B2 * | 9/2008 | Benakli et al. | 360/125.15 |
| 7,643,246 B2 * | 1/2010 | Yazawa et al. | 360/125.2 |
| 7,841,068 B2 | 11/2010 | Chen et al. | |
| 8,107,191 B2 | 1/2012 | Im et al. | |
| 8,233,234 B2 * | 7/2012 | Hsiao et al. | 360/125.09 |
| 8,472,137 B2 * | 6/2013 | Hirata et al. | 360/125.11 |
| 8,547,660 B2 * | 10/2013 | Allen et al. | 360/125.13 |
| 8,553,360 B2 * | 10/2013 | Hong | 360/125.03 |
| 8,619,390 B2 * | 12/2013 | Cazacu et al. | 360/125.07 |
| 8,670,212 B2 * | 3/2014 | Bai et al. | 360/125.15 |
| 2010/0277832 A1 | 11/2010 | Bai et al. | |
| 2010/0321825 A1 | 12/2010 | Nazarov | |

* cited by examiner

*Primary Examiner* — Mark Blouin
(74) *Attorney, Agent, or Firm* — Saile Ackerman LLC; Stephen B. Ackerman

(57) ABSTRACT

A magnetic write head is fabricated with its main pole attached to and magnetically coupled to a tapered yoke. The tapered yoke can be a top yoke (on the trailing side of the pole), a bottom yoke (on the leading side of the pole) or a combination of top and bottom configurations. The tapered portion of the yoke is at the distal end of the yoke and it is an extension of an otherwise uniformly thick yoke. It is found that the taper enables the yoke to be close to the ABS for better response times and a high data rate, while simultaneously being distant, producing less field disturbance by the shields and corresponding improvement of BER, and ATE/WATE. A taper of 45° is optimal for its production of uniform magnetization of the pole and optimal response times.

34 Claims, 5 Drawing Sheets

HIGH DATA RATE WRITER DESIGN

BACKGROUND

1. Technical Field

This disclosure relates to the fabrication of magnetic read/write heads that record at high data rates. More particularly, it relates to such a structure that incorporates a main writing pole that is responsive to high frequencies.

2. Description

For purposes of present high density magnetic recording, the recorded bits per inch (BPI) requires that the data rate at which writing occurs increases into the GHz (gigahertz) range. At this high frequency range, the bit error rate (BER) starts to increase along with the increasing frequency leading to a degradation of recording quality. In order to maintain recording quality by obtaining an adequate BER, it is critical that the frequency response of the writer be improved.

The frequency response of the writer is related to the speed with which the main writing pole can respond to the external current-driven magnetic field. Referring to FIG. 1a, there is shown a schematic illustration of a side cross-sectional view of a normal writer, in a plane through its main pole (20) center. The plane is perpendicular to its air-bearing surface (ABS) plane, which is shown as the dashed line (10). In the view shown, a magnetic medium (5) would be moving upward relative to the writer, so a leading shield (30) is below the tip (distal end) (25) of the main pole (20).

The main pole is supported from above by a top yoke (40), to which it is physically and magnetically coupled. Note that the term "top" will hereinafter refer to the horizontal trailing side of the main pole and the term "bottom" will refer to the horizontal leading side of the main pole. Note that the term "side" may often refer to a surface that is actually contiguous with another surface so that it forms an interface rather than an exposed or identifiable surface. Thus, when a top yoke is formed on a trailing side of a main pole the formation may be the result of a plating process so that the contiguous sides of the pole and yoke may actually form an interface. Nevertheless, when the term "side" is hereinafter referred to it will generally mean a surface or interface that can be envisioned as an identifiable horizontal plane.

A return pole (50) includes a trailing shield (60) (the term "trailing" here referring to the trailing side of the pole). Finally, the cross-sectional view also shows schematic cross-sections of two exemplary current carrying coils (80) (forming complete loops in a horizontal plane, the other half of the loop not being seen here) whose current activates the magnetic fields that are carried as flux by the main pole, emerging through the pole tip and creating magnetic transitions in the moving magnetic medium. The details of the closed flux loops will not be shown herein.

The overall structural shape of the writer determines the speed of the writing in the sense that the rate of change of current in the coils must be able to produce a correspondingly changing flux within the main pole/return pole circuit. This closed flux circuit fringes across the ABS at the tip (25) of the main pole and the writing speed depends on the rate at which the emergent flux can respond to the changing current.

The yoke (40), which here is a top yoke, is an additional structure of constant thickness t that can help the writing speed by the way in which it channels the flux to the main pole. The yoke is magnetically exchange coupled to the main pole and can be on top of the main pole (a top yoke), as it is here, or it can be beneath the main pole, forming a bottom yoke, or it can be formed in two segments, one on top and one on bottom. The yoke is usually recessed a certain amount from the ABS to reduce the disturbance of the shields on the write field. Disturbances by the shields can cause an undesired accidental data erasure (and corresponding high bit error rate (BER)) on tracks of the medium on which data has already been written. These tracks are usually immediately adjacent to the track currently being written on and the undesirable erasure effect is then denoted "adjacent track erasure," (ATE); or there can be the creation of even wider zones of track erasure, called "wide area track erasures" (WATE). It is known in the art that reducing the distance between the yoke and the ABS can improve high frequency response of the writer, but it is also known that this will worsen the ATE/WATE and BER.

Referring now to FIG. 1b, there is shown the writer of FIG. 1a viewed from its ABS. Note that leading and trailing surfaces will appear as "edges" in this view. There is seen the return pole (50), the trailing shield (60) immediately below the return pole and contiguous with it, the emergent triangular (or, more generally, trapezoidal) face of the pole tip (25) of the main pole (the body of the main pole extends rearward, away from the ABS, and is not seen) and the leading shield (30) beneath the pole tip. When the disk drive is active, the movement of the magnetic medium is vertically upward.

Also seen in this ABS view but not seen (or not seen clearly) in the view of FIG. 1a, are a write gap layer (70) separating the pole tip from the leading edge of the trailing shield and symmetrically placed side gap layers (80) on either side of the pole tip. The leading shield (30) is shown beneath the pole tip.

As noted above, the conventional writer design of FIG. 1a and FIG. 1b is limited in its write speed by the ability of the magnetic pole to respond to high frequency variations in the coil current. Shortening the yoke-to-ABS distance can improve write speed, but at the expense of errors caused by overwriting adjacent tracks. Some approaches to addressing this problem can be found referenced below, but none of them provide the results of the present disclosure.

U.S. Patent Application 2010/0277832 (Bai et al) shows a tapered yoke on one or both sides of a main pole.

U.S. Pat. No. 7,841,068 (Chen et al) discloses in FIG. 7 a bottom yoke with a taper.

U.S. Pat. No. 8,107,191 (Im et al) shows a sub-yoke on top of a main pole at an angle.

U.S. Patent Application 2010/0321825 (Nazarov) shows a non-tapered top yoke.

SUMMARY

The object of this disclosure is to provide a writer design that can significantly increase write speed (i.e. respond better to high frequency current variations) without the corresponding increase of ATE and/or WATE.

This object will be realized by the formation of a tapered yoke, physically (eg. by plating) and magnetically (eg. by exchange coupling) coupled to the main pole in a manner that will increase the distance between the distal end of the tapered yoke and the shields to reduce the perturbing effects of the shields on the write fields. Nevertheless, the structure will still allow a shorter yoke-to-ABS distance, which will increase the response of the pole to high frequency current variations. Micro-magnetic modeling allows creation of such a tapered yoke design that, when fabricated, optimizes the writer response time and minimizes BER, ATE and WATE as compared to the non-tapered yoke design of FIG. 1a.

BRIEF DESCRIPTION OF THE DRAWINGS

FIG. 1b is a schematic ABS view of the writer design shown in FIG. 1a.

FIG. 3 is a modeled magnetic field response (write field vs. time) of the magnetic field of a writer responding to a pulsed variable current, where the writer has the tapered bottom yoke of FIG. 2b with an optimal 45° taper, as compared to a writer having a non-tapered design, such as that of FIG. 1a.

DETAILED DESCRIPTION

The application discloses a magnetic writer having a tapered yoke that allows the yoke-to-shield distance to be increased for a reduction in ATE, WATE and corresponding BER caused by perturbing shield fields, while still allowing a decrease in the yoke-to-ABS distance and a uniform magnetization of the pole for an increase in write speed. The yoke may be formed above the pole, below the pole or both above and below the pole. It is noted that hereinafter all pole, yoke and shield materials are magnetic materials, such as alloys of Fe, Co and Ni, which are known in the art.

Figure 1A:
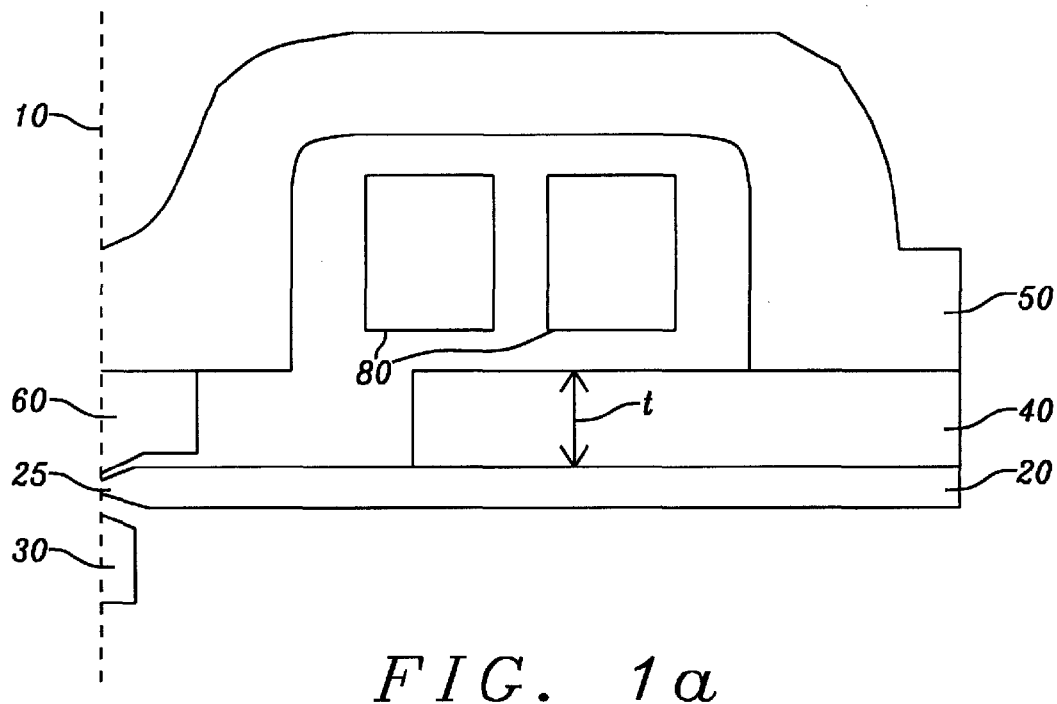
FIG. 1a is a schematic illustration of side cross-sectional view, through a central plane of the main pole, of a present writer design.
Figure 1B:
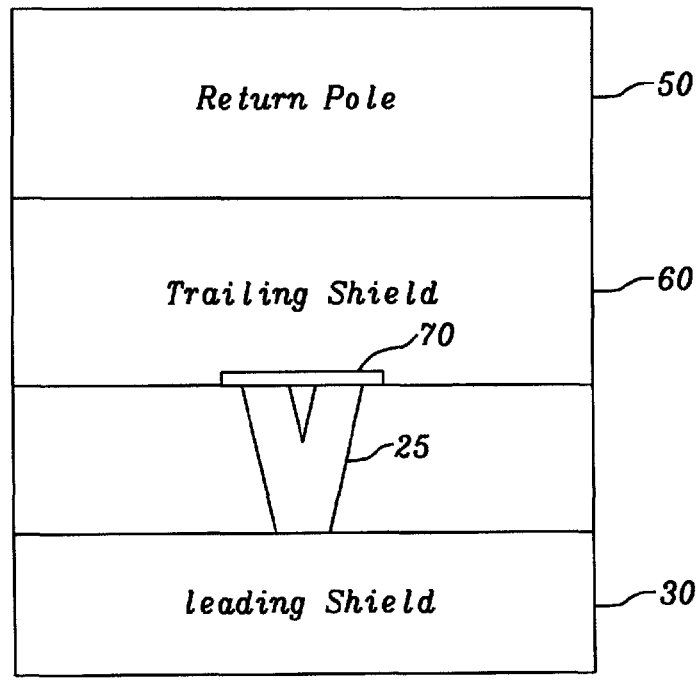
Figure 2A:
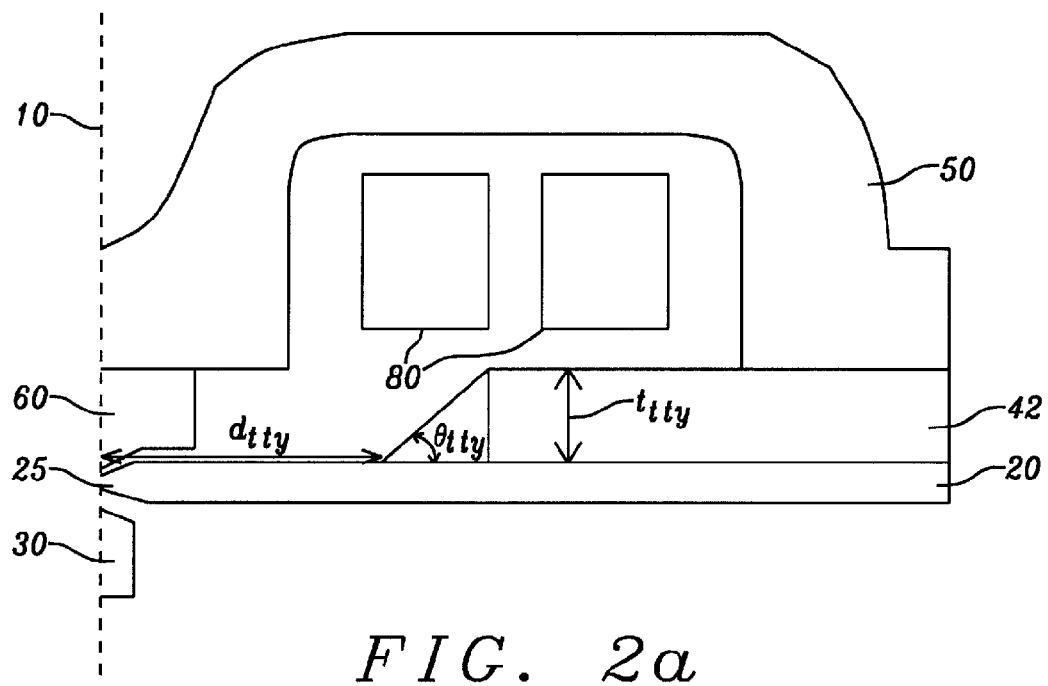
FIG. 2a is a schematic illustration of side cross-sectional view, through a central plane of the main pole, of a writer design that includes a tapered top yoke to meet the objects of this disclosure.

Referring to FIG. 2a, there is shown a schematic cross-sectional view, taken vertically in a plane through the center line of the main pole and perpendicular to the ABS plane, of a writer formed in accord with the objects of this disclosure and incorporating a tapered top yoke. The plane of visualization is perpendicular to its air-bearing surface (ABS) plane, which is shown as the dashed line (10). In the view shown, a magnetic medium (5) would be moving upward relative to the writer, so a leading shield (30) is below the tip (25) of the main pole (20). The main pole is supported from above (its trailing surface) and magnetically coupled to the tapered top yoke (42), which is structurally and functionally different from the non-tapered yoke shown in FIG. 1a.

A return pole (50) includes a trailing shield (60) and completes the flux circuit together with the main pole and yoke structure. Finally, the cross-section also shows schematic cross-sections of two exemplary current carrying coils (forming complete loops in a horizontal plane) whose current activates the magnetic fields that circulate as flux lines through the main pole/yoke/return pole circuit and are carried across the ABS at the pole tip to intersect the moving magnetic medium. The overall structural shape of the writer determines the speed of the writing in the sense that the rate of change of current in the coils produces a correspondingly changing flux within the main pole and the writing speed depends on the rate at which the flux can respond to the changing current.

The tapered yoke (42), which here is a tapered top yoke, is an additional structure that will improve the writing speed. The yoke is magnetically exchange coupled to the main pole and is here formed on top (the trailing side) of the main pole. The distal end (end closest to the ABS) of the tapered yoke is usually recessed a certain distance, generically denoted $d_{ty}$, from the ABS to reduce the disturbance of the shields on the write field. Disturbances by the shields, themselves caused by the effects of the fields of the yoke, can cause an undesired accidental data erasure on tracks of the medium on which data has already been written. These tracks are usually immediately adjacent to the track currently being written on and the undesirable effect is denoted "adjacent track erasure," (ATE) or there can be the creation of even wider regions of erasures, called "wide area track erasures" (WATE). It is known in the art that reducing the distance between the yoke and the ABS can improve high frequency response of the writer, but it will worsen the ATE and/or WATE.

By tapering and positioning the yoke as is done here, at least two effects are achieved. The distal end of the tapered yoke is effectively positioned closer to the ABS (10), so that it enables a faster writing rate, yet it is also more distant from the shields (30), (60), so that the shields do not adversely affect the writing fields that emerge across the ABS.

Extensive modeling of the effect of different tapers has led to the conclusion that a 45° taper produces the optimal increase in writing speed with a decrease in BER. The modeling results indicate that the taper angle has an important influence on the magnetic domain structure that forms within the pole tip. More specifically, the 45° taper produces a more uniform pattern of magnetization than other taper angles. The greater the uniformity of magnetic domain structure, the faster is the rate of switching that can be produced. A taper that is too shallow does not provide a more uniform magnetization pattern to the pole tip, but it slows down the rate of writing flux propagation to the pole tip. The yoke shape is designed to follow the main pole.

As can be seen in the figure, the notation for the relevant tapered top yoke (tty) dimensions are:

(i) the tapered top yoke-ABS distance, now denoted $d_{tty}$, (double-ended arrow (A));

(ii) the thickness of the tapered top yoke, $t_{tty}$ (double-ended arrow (B))

(iii) the angle of the tapered top yoke taper $\theta_{tty}$, (curved double-ended arrow (C)).

Values for the above dimensions are as follows. The thickness of the tapered top yoke ($t_{tty}$) can be in the range between approximately 0.1 to 1.0 microns. The taper angle ($\theta_{tty}$) of the tapered top yoke can be in the range between approximately 15° and 75°, but is here shown as the optimal 45° The distance from the tip of the tapered top yoke to the ABS ($d_{tty}$) plane can be between approximately 0.2 to 2 microns. The main pole thickness can be between approximately 0.1 and 0.5 microns. The width of the main pole can be between approximately 1 and 20 microns.

Figure 2B:
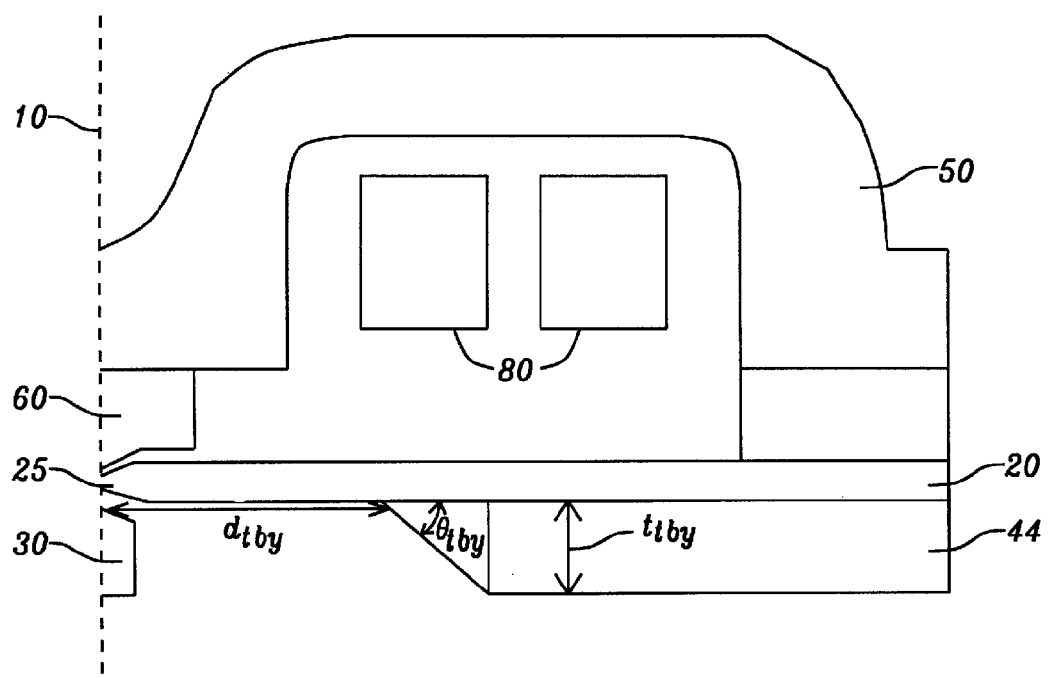
FIG. 2b is a schematic illustration of side cross-sectional view, through a central plane of the main pole, of a writer design that includes a tapered bottom yoke to meet the objects of this disclosure.

Referring to FIG. 2b, there is shown a schematic cross-sectional view, taken vertically in a plane through the center line of the main pole and perpendicular to the ABS plane, of a writer formed in accord with the objects of this disclosure and having a tapered bottom yoke design. The plane is perpendicular to its air-bearing surface (ABS) plane, which is shown as the dashed line (10). In the view shown, a magnetic medium (5) would be moving upward relative to the writer, so a leading shield (30) is below the tip (25) of the main pole (20). The main pole is supported from below and magnetically coupled to the tapered bottom yoke (44), which is structurally and functionally different from the non-tapered yoke shown in FIG. 1a.

A return pole (50) includes a trailing shield (60) and completes the flux circuit together with the main pole and yoke structure. Finally, the cross-section also shows schematic cross-sections of two exemplary current carrying coils (forming complete loops in a horizontal plane) whose current activates the magnetic fields that circulate as flux lines through the main pole/yoke/return pole circuit and are carried across the ABS at the pole tip to intersect the moving magnetic medium. The overall structural shape of the writer determines the speed of the writing in the sense that the rate of change of current in the coils produces a correspondingly changing flux within the main pole and the writing speed depends on the rate at which the flux can respond to the changing current.

The tapered yoke (44), which here is a tapered bottom yoke, is an additional structure that can help the writing speed. The yoke is magnetically exchange coupled to the main pole is here beneath (to the leading edge side) the main pole. The yoke is usually recessed a certain amount from the ABS to reduce the disturbance of the shields on the write field. Disturbances by the shields can cause an undesired accidental data erasure on tracks of the medium on which data has already been written. These tracks are usually immediately adjacent to the track currently being written on and the undesirable effect is denoted "adjacent track erasure," (ATE) or there can be the creation of even wider regions of erasures, called "wide area track erasures" (WATE). It is known in the art that reducing the distance between the yoke and the ABS can improve high frequency response of the writer, but it will worsen the ATE/WATE.

By tapering the bottom yoke as is done here, two effects are achieved. The yoke is effectively positioned closer to the ABS (10), so that it enables a faster writing rate, yet it is also more distant from the shields (30), (60), so that the shields do not adversely affect the writing fields that emerge across the ABS.

Extensive modeling of the effect of different tapers has led to the conclusion that a 45° taper produces the optimal increase in writing speed with a decrease in BER. As can be seen in the figure, the notation for the relevant tapered bottom yoke (tby) dimensions are:
(i) the tapered bottom yoke-ABS distance, now denoted $d_{tby}$, (double-ended arrow (A));
(ii) the thickness of the tapered bottom yoke, $t_{tby}$ (double-ended arrow (B))
(iii) the angle of the tapered bottom yoke taper $\theta_{tby}$, (curved double-ended arrow (C)).

Values for the above dimensions are as follows. The thickness of the tapered bottom yoke ($t_{tby}$) can be in the range between approximately 0.1 to 1.0 microns. The taper angle ($\theta_{tby}$) of the tapered bottom yoke can be in the range between approximately 15° and 75°, but is here shown as the optimal 45° The distance from the tip of the tapered bottom yoke to the ABS ($d_{tby}$) plane can be between approximately 0.2 to 2 microns. The main pole thickness can be between approximately 0.1 and 0.5 microns. The width of the main pole can be between approximately 1 and 20 microns.

Figure 2C:
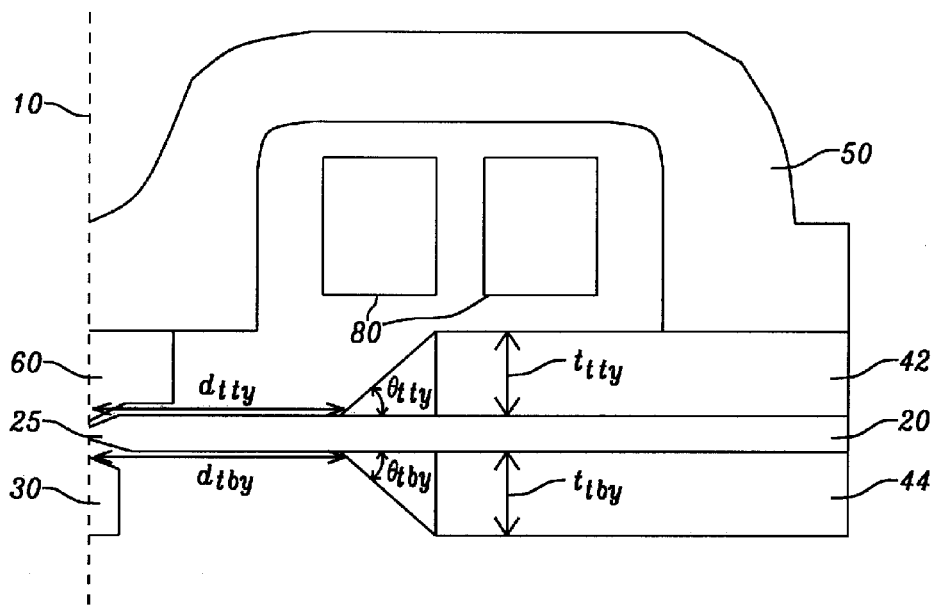
FIG. 2c is a schematic illustration of side cross-sectional view, through a central plane of the main pole, of a writer design that includes a tapered top yoke and a tapered bottom yoke, the combination of which will meet the objects of this disclosure.

Referring to FIG. 2c, there is shown a schematic cross-sectional view, taken vertically in a plane through the center line of the main pole and perpendicular to the ABS plane, of a writer formed in accord with the objects of this disclosure and including both a tapered top yoke and a tapered bottom yoke. The plane is perpendicular to its air-bearing surface (ABS) plane, which is shown as the dashed line (10). In the view shown, a magnetic medium (5) would be moving upward relative to the writer, so a leading shield (30) is below the tip (25) of the main pole (20). The main pole is supported both from above and below and magnetically coupled to a tapered top yoke (42) and a tapered bottom yoke (44), which is structurally and functionally different from the non-tapered yoke shown in FIG. 1a.

A return pole (50) includes a trailing shield (60) and completes the flux circuit together with the main pole and yoke structure. Finally, the cross-section also shows schematic cross-sections of two exemplary current carrying coils (forming complete loops in a horizontal plane) whose current activates the magnetic fields that circulate as flux lines through the main pole/yoke/return pole circuit and are carried across the ABS at the pole tip to intersect the moving magnetic medium. The overall structural shape of the writer determines the speed of the writing in the sense that the rate of change of current in the coils produces a correspondingly changing flux within the main pole and the writing speed depends on the rate at which the flux can respond to the changing current.

The tapered yokes (42), (44), which here are a combined tapered top yoke (42) and tapered bottom yoke (44), is an additional structure that can help the writing speed. The yokes are each magnetically exchange coupled to the main pole is here on top and bottom of the main pole. Each yoke is usually recessed a certain amount from the ABS to reduce the disturbance of the shields on the write field. Disturbances by the shields can cause an undesired accidental data erasure on tracks of the medium on which data has already been written. These tracks are usually immediately adjacent to the track currently being written on and the undesirable effect is denoted "adjacent track erasure," (ATE) or there can be the creation of even wider regions of erasures, called "wide area track erasures" (WATE). It is known in the art that reducing the distance between the yoke and the ABS can improve high frequency response of the writer, but it will worsen the ATE/WATE.

By tapering the yokes as is done here for each of the top and bottom yokes, two effects are achieved. Each yoke is effectively positioned closer to the ABS (10), so that it enables a faster writing rate, yet it is also more distant from the shields (30), (60), so that the shields do not adversely affect the writing fields that emerge across the ABS. Extensive modeling of the effect of different tapers has led to the conclusion that a 45° taper produces the optimal increase in writing speed with a decrease in BER. As can be seen in the figure, the relevant dimensions are separately denoted for the top and bottom yokes using the notations given above. It is to be noted that each dimensional range cited above can be independently optimized and applied separately to each of the top and bottom yokes.

Figure 3:
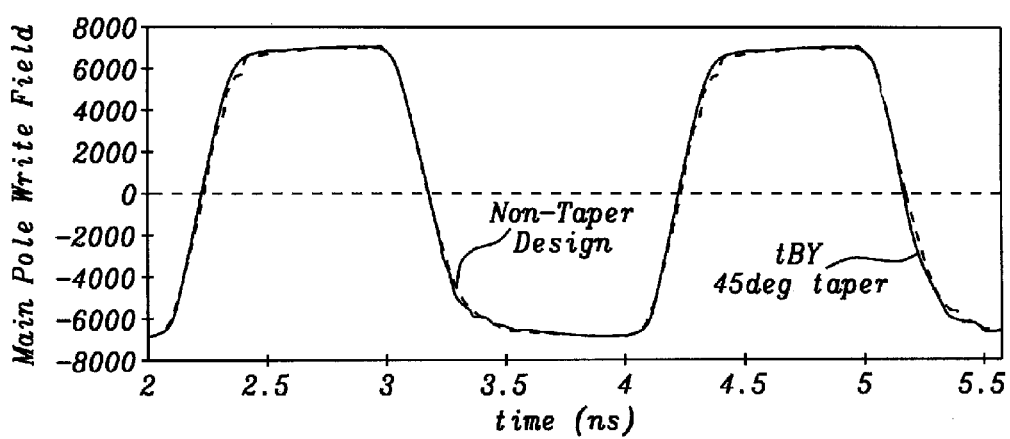

Referring now to FIG. 3, there is shown a graphical display of the results of modeling the magnetic field response time of both a 45° tapered bottom yoke (eg., as shown in FIG. 2b) and non-tapered yoke (eg., as shown in FIG. 1a). The graph displays the main pole write field produced by a square wave current pulse in units of Oersteds, as a function of time, measured in nanoseconds (ns). As can be seen in the waveforms, the response of the non-tapered design has a less steep descent of the square-wave pulse indicating a poorer ability to follow the current pulse.

Figure 4:
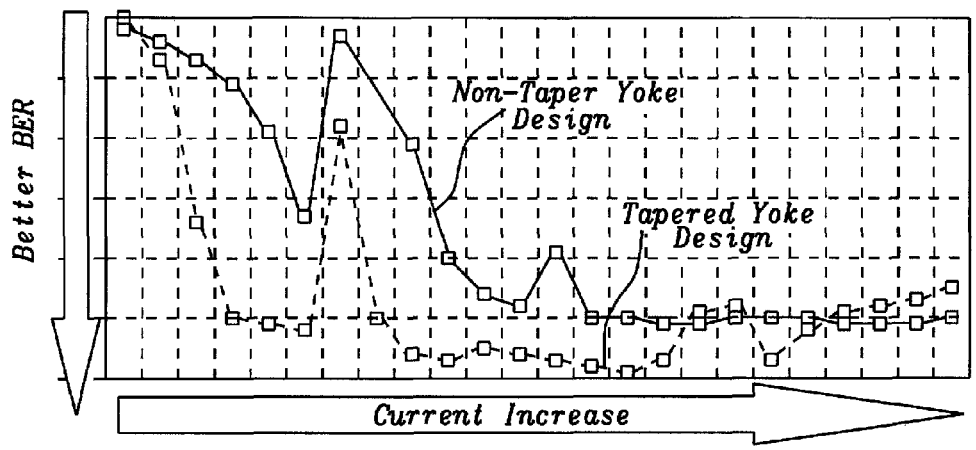
FIG. 4 is an empirical result plotting the bit error rate (BER) as a function of write current for a tapered-yoke design writer and a non-tapered-yoke design writer.

Referring finally to FIG. 4, there is shown an experimental result of tracking the bit error rate (BER) of both a tapered and non-tapered bottom yoke writer as a function of write current magnitude. As can be seen, the non-tapered yoke design maintains a higher BER than the tapered design for virtually the entire range of write currents. Correspondingly, the improved BER of the tapered yoke design appears very quickly particularly at low currents.

The fabrication of the tapered yoke structure is readily accomplished by a sequence of plating and shaping operations, typically performed by ion milling, that defines the yokes and the main pole sequentially. The nature of these processes can be inferred from the illustrations of the finished products in FIGS. 2a, 2b and 2c. An exemplary sequence of steps is now shown to illustrate the formation of a tapered top yoke, such as is seen in FIG. 2a. These steps are now shown with reference to FIGS. 5a-5e. Following this, a similar sequence of steps to form a tapered bottom yoke will be illustrated in FIGS. 6a-6d.

Figure 5A:
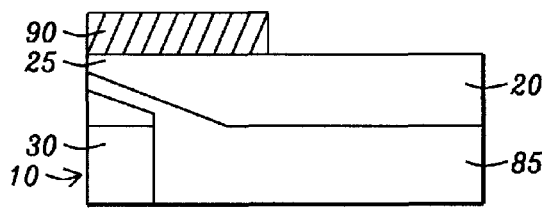
FIGS. 5a-5d is a sequence of schematic illustrations showing a method of forming a tapered yoke on the top of the main pole.

Referring first to FIG. 5a, there is shown a side cross-sectional view of that portion of the write head that has already been formed, now being prepared for the formation of a tapered top yoke over a previously formed main magnetic pole. There is seen in the figure the ABS of the writer (10), the main pole (20), the pole tip (25) and the leading shield (30) below the upward sloping tip of the main pole. A layer (85) of non-magnetic insulating material, such as $Al_2O_3$, surrounds the pole and also forms a gap between the main pole and the leading shield. A masking or dam layer of photoresistive material (90) has been formed over the ABS end of the main pole (20), covering its tip (25).

Figure 5B:
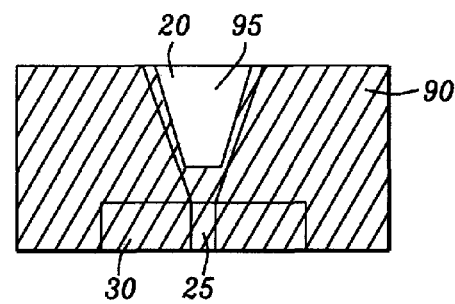

Referring to FIG. 5b, there is shown the fabrication of FIG. 5a, this time from an overhead view. It can be seen that the masking layer of photoresistive material covers the entire surface, but forms an opening (95) that exposes the upper surface (20) of the main pole, which has a substantially triangular horizontal cross-sectional shape. The very narrow tip (25) of the main pole extends over the top of the leading shield (30), both being shown through the photoresistive layer (90).

Figure 5C:
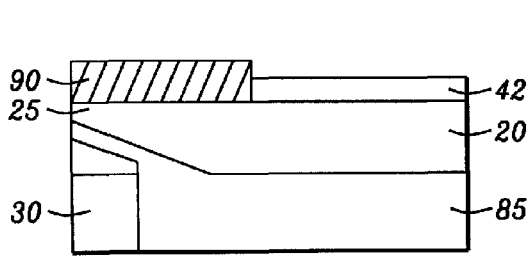

Referring now to FIG. 5c, there is shown a layer of material that will form the top yoke (42) that has now been plated into the mask opening shown as (95) in FIG. 5b.

Figure 5D:
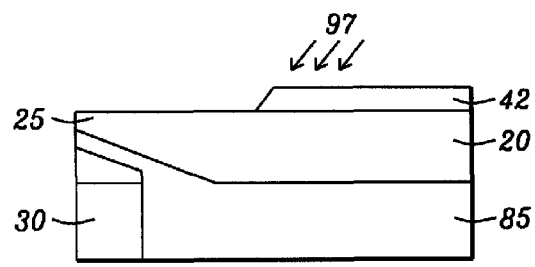

Referring next to FIG. 5d, there is shown the fabrication of FIG. 5c, with the masking photoresistive layer having been removed and the top yoke (42), now filling the masked off region (95) in FIG. 5b, having been tapered by an ion-milling process (shown as down-sloping arrows (97)).

It is to be noted that if the yoke is to be a bottom yoke, the process steps of FIGS. 5a-5e would be substantially reversed, as is now schematically illustrated in FIGS. 6a-6d.

Figure 6A:
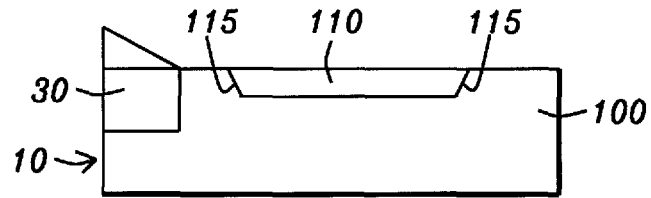
FIGS. 6a-6d is a sequence of schematic illustrations showing a method of forming a main pole on top of a bottom yoke.

Referring first to FIG. 6a, there is shown a schematic side cross-sectional view of a substrate (100), in which there is formed a trench (110) that will serve as a plating form for the deposition of the bottom yoke. A layer of material will be plated onto the substrate so that the bottom of the layer resides in the trench to form the bottom tapered yoke while the remaining thickness of the layer will be patterned to form the main pole. The main pole and bottom yoke are thereby formed as a monolithic unit. Two ends (115) of the trench have been milled to create the appropriate tapers for the yoke about to be plated. A leading shield (30) has already been formed at the ABS end (10) of the fabrication. We will not be concerned with the formation of that shield herein.

Figure 6B:
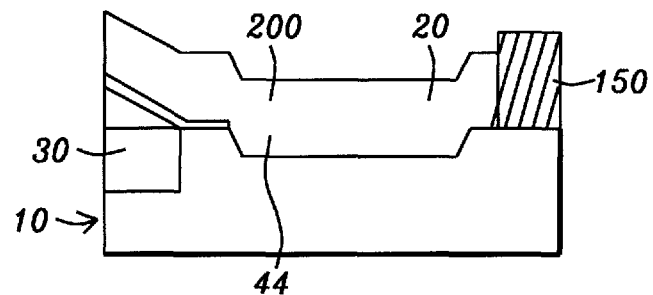

Referring to schematic FIG. 6b, there is shown the fabrication of FIG. 6a with the addition of a plated layer (200) formed over the substrate and conformally filling the trench (110). This layer includes the bottom yoke (44) and what will become the main pole (20) as a monolithic unit. The plated layer has been patterned horizontally by being deposited within a shaped layer of photoresistive material (150) that forms a mask or dam that surrounds the plated layer as will be shown in FIG. 6c.

Figure 6C:
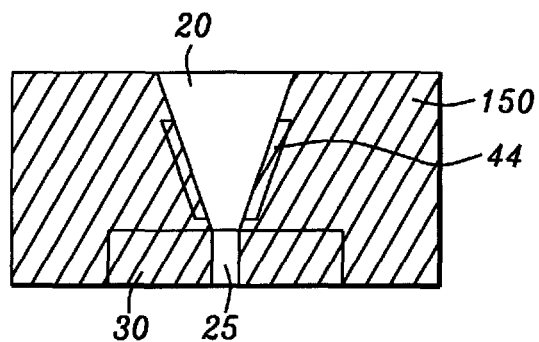

Referring to FIG. 6c, there is shown an overhead view of the fabrication in FIG. 6b, showing the masking layer of photoresistive material (150) surrounding the main pole and forming its triangular periphery. The thin tip (25) of the main pole is shown extending over the leading shield (30) that lies beneath it.

Figure 6D:
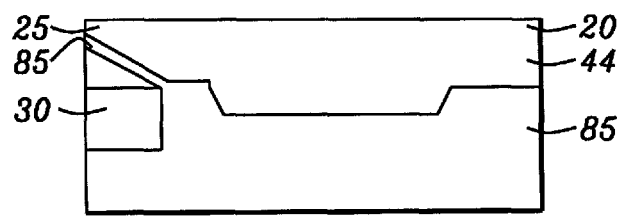

Referring to FIG. 6d, there is shown the fabrication of FIG. 6c with the photoresistive masking material removed and the upper surface of the main pole (20) having been planarized and reduced in overall thickness to the degree desired. The pole is surrounded by a non-magnetic filler material (85), such as a layer of $Al_2O_3$, that also forms a gap (85) between it and the leading shield (30) Note that the upper and lower tapered yokes are subject to all of the dimensional limitations previously described above.

Although the fabrication steps are not shown specifically, the fabrication of FIG. 6d can now be used as the starting point for the formation of a double yoke, by forming a tapered upper yoke over the planarized main pole in the manner of FIGS. 5a-5e.

As is understood by a person skilled in the art, the embodiments of the present disclosure are illustrative of the present disclosure rather than limiting of the present disclosure. Revisions and modifications may be made to methods, materials, structures and dimensions employed in forming and providing a tapered top yoke or tapered bottom yoke or a combination thereof, on a main pole in a magnetic write head, while still forming and providing such a tapered yoke and main pole combination and its method of formation in accord with the spirit and scope of the present disclosure as defined by the appended claims.

What is claimed is:

1. A magnetic write head comprising:
    a main pole having a trailing side and a leading side and a distal end that terminates in a pole tip at an ABS of said write head;
    at least one tapered magnetic yoke having a side that is contiguous with and physically and magnetically coupled to at least one of said trailing side and said leading side of said main pole;
    wherein said at least one tapered magnetic yoke has a distal end that is closest to said ABS; and
    wherein said at least one tapered magnetic yoke is formed in two continuous portions, a first portion having a constant thickness, $t_{ty}$, along its length and a second portion extending distally from said first portion and forming a portion of reducing thickness in a distal direction that tapers at a constant angle $\theta_{ty}$ with said main pole, said reducing thickness being reduced from said constant thickness, $t_{ty}$, to a zero thickness at a point of contiguity with said main pole and wherein said point of contiguity is at a distance $d_{ty}$ from said ABS.

2. The magnetic write head of claim 1 further comprising a shield configuration of a leading shield and a trailing shield, wherein flux emitted from said shields do not create adjacent track erasures (ATE) or wide area track erasures (WATE).

3. The magnetic write head of claim 1 wherein said at least one tapered magnetic yoke that is formed on said leading side of said main pole and is a tapered bottom yoke.

4. The magnetic write head of claim 1 wherein said at least one tapered magnetic yoke is formed on said trailing side of said main pole and is a tapered top yoke.

5. The magnetic write head of claim 1 wherein one of said at least one tapered magnetic yoke is formed on said leading side of said main pole and is a tapered bottom yoke and wherein another one of said at least one tapered magnetic yoke is formed on said trailing side of said main pole and is a tapered top yoke.

6. The magnetic write head of claim 3 wherein $t_{ty}$ is denoted $t_{tby}$ and is between approximately 0.1 and 1.0 microns.

7. The magnetic write head of claim 4 wherein $t_{ty}$ is denoted $t_{tty}$ and is between approximately 0.1 and 1.0 microns.

8. The magnetic write head of claim 5 wherein $t_{ty}$ is denoted $t_{tby}$ for said tapered bottom yoke and is between approximately 0.1 and 1.0 microns and wherein $t_{ty}$ is denoted $t_{tty}$ for said tapered top yoke and is between approximately 0.1 and 1.0 microns.

9. The magnetic write head of claim 3 wherein $d_{ty}$ is denoted $d_{tby}$ and is between approximately 0.2 to 2 microns.

10. The magnetic write head of claim 4 wherein $d_{ty}$ is denoted $d_{tty}$ and is between approximately 0.2 to 2 microns.

11. The magnetic write head of claim 5 wherein when $d_{ty}$ is denoted $d_{tby}$ it is between approximately 0.2 to 2 microns and wherein when $d_{ty}$ is denoted $d_{tty}$ it is between approximately 0.2 to 2 microns.

12. The magnetic write head of claim 3 wherein $\theta_{ty}$ is denoted $\theta_{tty}$ and is between approximately 15° and 75°.

13. The magnetic write head of claim 4 wherein $\theta_{ty}$ is denoted $\theta_{tby}$ and is between approximately 15° and 75°.

14. The magnetic write head of claim 5 wherein when $\theta_{ty}$ is denoted $\theta_{tty}$ it is between 15° and 75° and wherein when $\theta_{ty}$ is denoted $\theta_{tby}$ it is between 15° and 75°.

15. The magnetic write head of claim 12 wherein when $\theta_{tty}=45°$ a magnetization of said main pole tip is maximally uniform.

16. The magnetic write head of claim 13 wherein $\theta_{tby}=45°$ a magnetization of said main pole tip is maximally uniform.

17. The magnetic write head of claim 14 wherein when both $\theta_{tty}$ and $\theta_{tby}$ are 45° the magnetization of said main pole tip is maximally uniform.

18. A method of forming a write head, comprising:
providing a substrate;
forming a patterned trench in said substrate wherein said pattern defines a tapered shape of a bottom yoke;
forming a mask of photoresistive material surrounding said trench, wherein said mask defines the peripheral shape of a main pole and pole tip,
plating a material layer on said substrate wherein a bottom portion of said material layer conformally fills said trench and thereby acquires a shape of a tapered bottom yoke and wherein said mask of photoresistive material patterns a periphery of an upper portion of said material layer to form a magnetic pole;
removing said mask and planarizing an upper surface of said material layer forming, thereby, a thinned and planar magnetic pole having a tapered bottom yoke formed monolithically beneath it.

19. A method of forming a write head, comprising:
providing a substrate having a planarized and patterned main pole formed thereon, wherein said main pole has a tapered bottom yoke formed monolithically beneath it;
forming a photoresistive mask on said main pole, said mask defining the horizontal periphery of a top yoke;
forming a material layer on said main pole within said mask, wherein said material layer is patterned and acquires the horizontal periphery of a top yoke;
removing said mask;
milling said patterned material layer, using an ion-milling process to form a tapered top yoke.

20. The method of claim 18 wherein said tapered bottom yoke is formed in two continuous portions, a first portion having a constant thickness, $t_{tby}$, along its length and a second portion extending distally from said first portion and forming a portion of reducing thickness in a distal direction that tapers at a constant angle $\theta_{tby}$ with said main pole, said reducing thickness being reduced from said constant thickness, $t_{tby}$, to a zero thickness at a point of contiguity with said main pole and wherein said point of contiguity is at a distance $d_{tby}$ from an ABS.

21. The method of claim 19 wherein said tapered top yoke is formed in two continuous portions, a first portion having a constant thickness, $t_{tty}$, along its length and a second portion extending distally from said first portion and forming a portion of reducing thickness in a distal direction that tapers at a constant angle $\theta_{tty}$ with said main pole, said reducing thickness being reduced from said constant thickness, $t_{tty}$, to a zero thickness at a point of contiguity with said main pole and wherein said point, of contiguity is at a distance $d_{tty}$ from said ABS.

22. The method of claim 19 wherein said planarized and patterned main pole includes a tapered bottom yoke formed thereunder, whereby a main pole having both a tapered top yoke and a tapered bottom yoke is produced.

23. The method of claim 22 wherein said tapered bottom yoke is formed in two continuous portions, a first portion having a constant thickness, $t_{tby}$, along its length and a second portion extending distally from said first portion and forming a portion of reducing thickness in a distal direction that tapers at a constant angle $\theta_{tby}$ with said main pole, said reducing thickness being reduced from said constant thickness, $t_{tby}$, to a zero thickness at a point of contiguity with said main pole and wherein said point of contiguity is at a distance $d_{tby}$ from an ABS.

24. The method of claim 23 wherein $t_{tby}$ is between approximately 0.1 and 1.0 microns.

25. The method of claim 22 wherein $t_{tby}$ is between approximately 0.1 and 1.0 microns and wherein $t_{tty}$ is between approximately 0.1 and 1.0 microns.

26. The method of claim 21 wherein $t_{tty}$ is between approximately 0.1 and 1.0 microns.

27. The method of claim 24 wherein $d_{tby}$ is between approximately 0.2 to 2 microns.

28. The method of claim 21 wherein $d_{tty}$ is between approximately 0.2 to 2 microns.

29. The method of claim 24 wherein $\theta_{tby}$ is between approximately 15° and 75°.

30. The method of claim 25 wherein $\theta_{tty}$ is between approximately 15° and 75°.

31. The method of claim 26 wherein $\theta_{tty}$ is between 15° and 75°.

32. The method of claim 24 wherein $\theta_{tby}=45°$ to obtain a magnetization of said main pole that is maximally uniform.

33. The method of claim 25 wherein $\theta_{tty}=45°$ to obtain a magnetization of said main pole that is maximally uniform.

34. The method of claim 26 wherein $\theta_{tty}=45°$ to obtain a magnetization of said main pole that is maximally uniform.

* * * * *